United States Patent [19]
Miller

[11] Patent Number: 5,765,843
[45] Date of Patent: Jun. 16, 1998

[54] LOAD-CARRYING DOLLY

[76] Inventor: Wayne A. Miller, 125 Sterling Ave., Orrville, Ohio 44667

[21] Appl. No.: 592,787

[22] Filed: Jan. 26, 1996

Related U.S. Application Data

[63] Continuation-in-part of Ser. No. 401,157, Mar. 9, 1995, abandoned.

[51] Int. Cl.$^6$ .................... B62B 3/10; B62B 3/12
[52] U.S. Cl. .............. 280/79.7; 280/43.1; 280/47.16; 280/47.2; 280/47.29
[58] Field of Search ............... 280/47.12, 47.16, 280/47.18, 47.19, 47.2, 47.21, 47.28, 47.29, 47.315, 39, 40, 62, 79.3, 79.7, 652, 11.22, 43, 43.1, 239

[56] References Cited

U.S. PATENT DOCUMENTS

| | | |
|---|---|---|
| 394,385 | 12/1888 | McMillin. |
| 1,409,838 | 3/1922 | Emery et al. |
| 2,797,927 | 7/1957 | Raff .................... 280/40 |
| 3,043,603 | 7/1962 | Major, Sr. ............ 280/40 |
| 3,306,624 | 2/1967 | Goss .................. 280/47.34 |
| 3,580,601 | 5/1971 | Miles ................. 280/79.7 |
| 3,729,209 | 4/1973 | Litz .................. 280/652 |
| 4,488,733 | 12/1984 | Hellsten ............. 280/47.16 |
| 4,630,838 | 12/1986 | Stockton ............. 280/47.17 |
| 4,793,624 | 12/1988 | Mace ................. 280/47.16 |
| 4,921,270 | 5/1990 | Schoberg ............. 280/655.1 |
| 4,950,003 | 8/1990 | Holtz ................ 280/47.315 |
| 5,120,072 | 6/1992 | Laramie .............. 280/47.17 |
| 5,244,221 | 9/1993 | Ward ................. 280/79.7 |
| 5,284,410 | 2/1994 | Sare ................. 280/79.7 |
| 5,303,940 | 4/1994 | Brandner ............. 280/11.22 |
| 5,445,399 | 8/1995 | Salvucci ............. 280/47.2 |
| 5,531,463 | 7/1996 | Givens ............... 280/47.2 |

*Primary Examiner*—Anne Marie Boehler
*Attorney, Agent, or Firm*—Sand & Sebolt

[57] ABSTRACT

A hand truck for moving sheet material has a laterally extending shelf and a generally upright frame, which extends upwardly from the shelf. The frame may be formed by tubular metal of generally inverted U-shape and together with the frame support a load. The hand truck has a pair of inline primary wheels, mounted on fixed parallel axes, near the two ends of the shelf and the lower ends of the two sides of the frame. The two primary wheels lie in a common plane. A turning wheel, also mounted for rotation about a fixed axis, is situated midway between the two primary wheels but slightly out of line therewith. The turning wheel is of smaller diameter than the two primary wheels, and the plane in which it is mounted forms a small acute angle with the plane of the primary wheels. The turning wheel is out of contact with a supporting surface when both primary wheels touch the supporting surface. For movement of the hand truck in a straight path, both primary wheels touch a supporting surface and the turning wheel is out of contact with the supporting surface. For turning movement, one of the two primary wheels and the turning wheels are in contact with the supporting surface, while the other primary wheel is raised slightly above the supporting surface so as to be out of contact. The turning wheels may be adjustably mounted by a hand or foot operated lever.

20 Claims, 9 Drawing Sheets

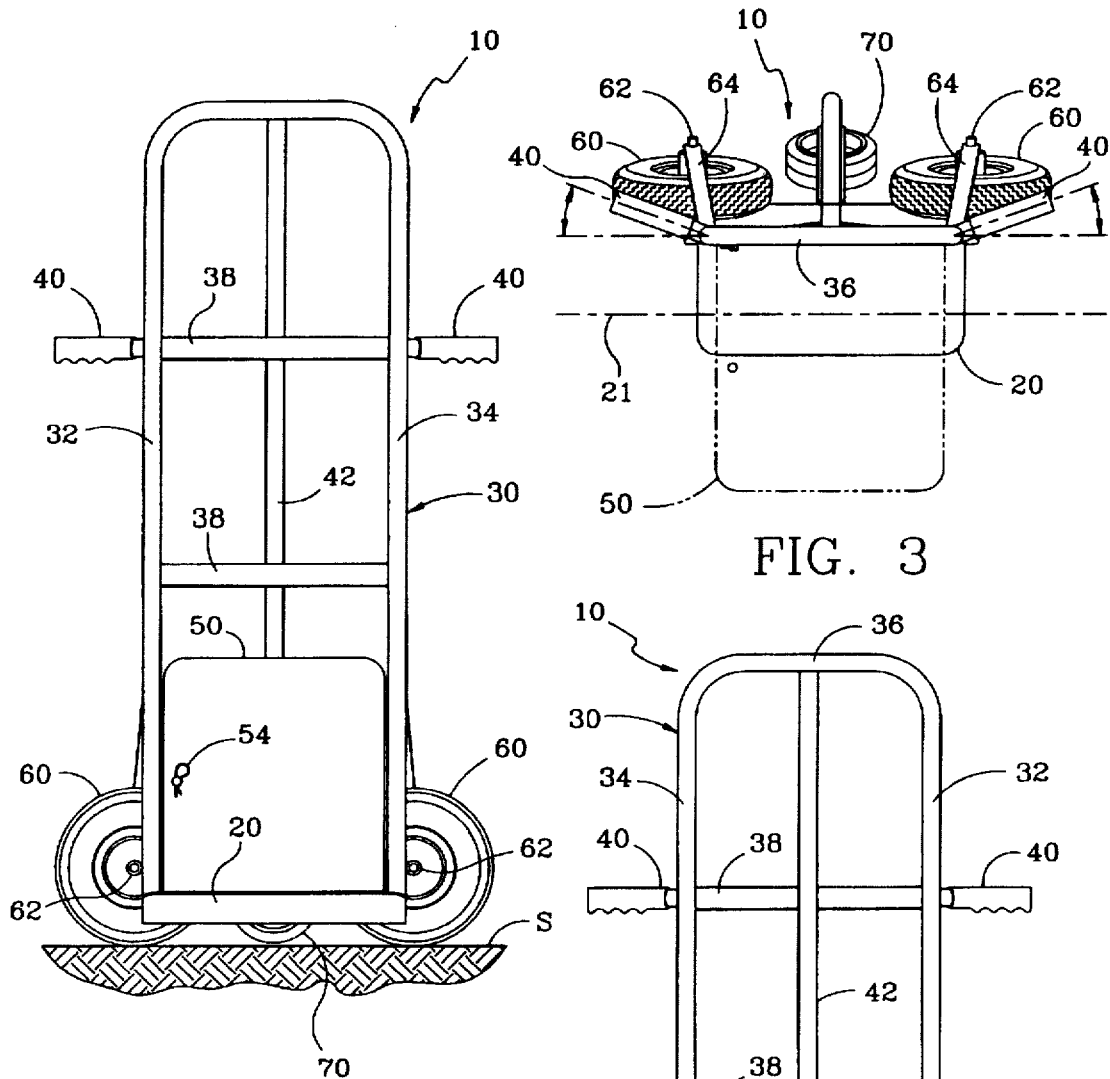
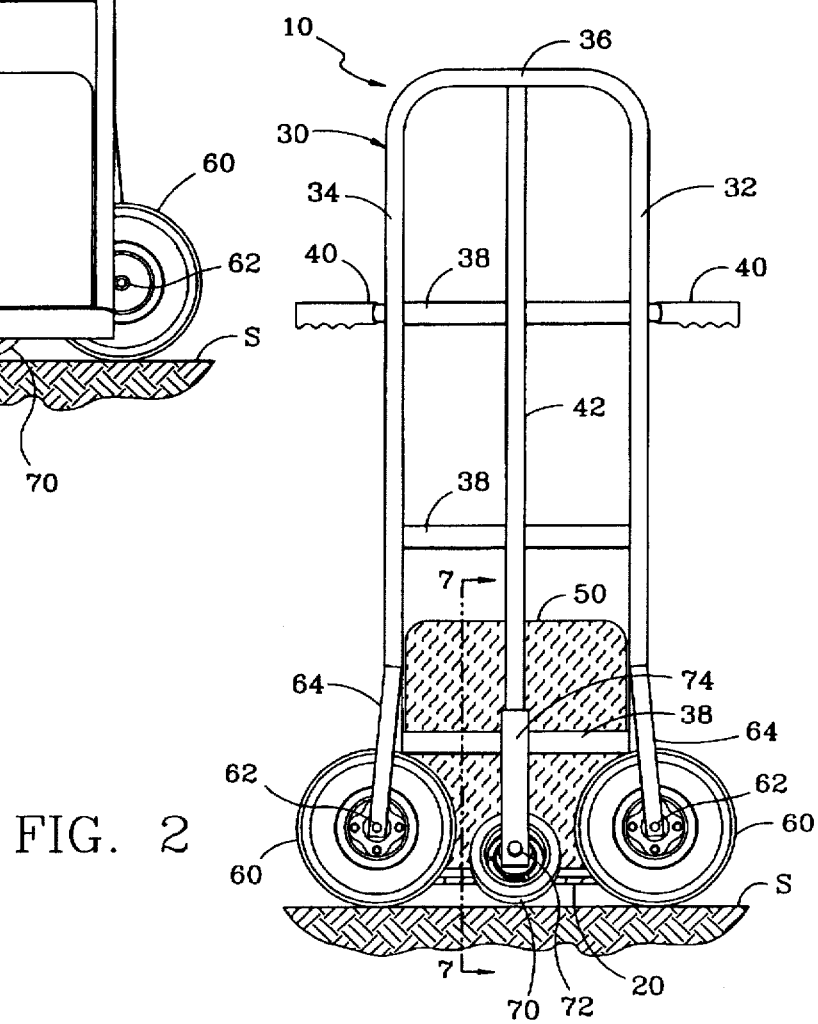
FIG. 1
FIG. 3
FIG. 2

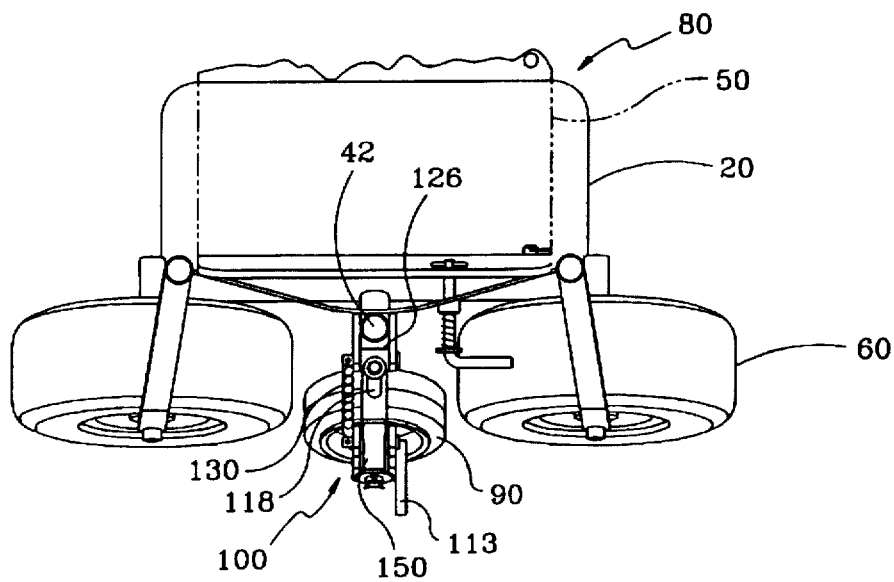
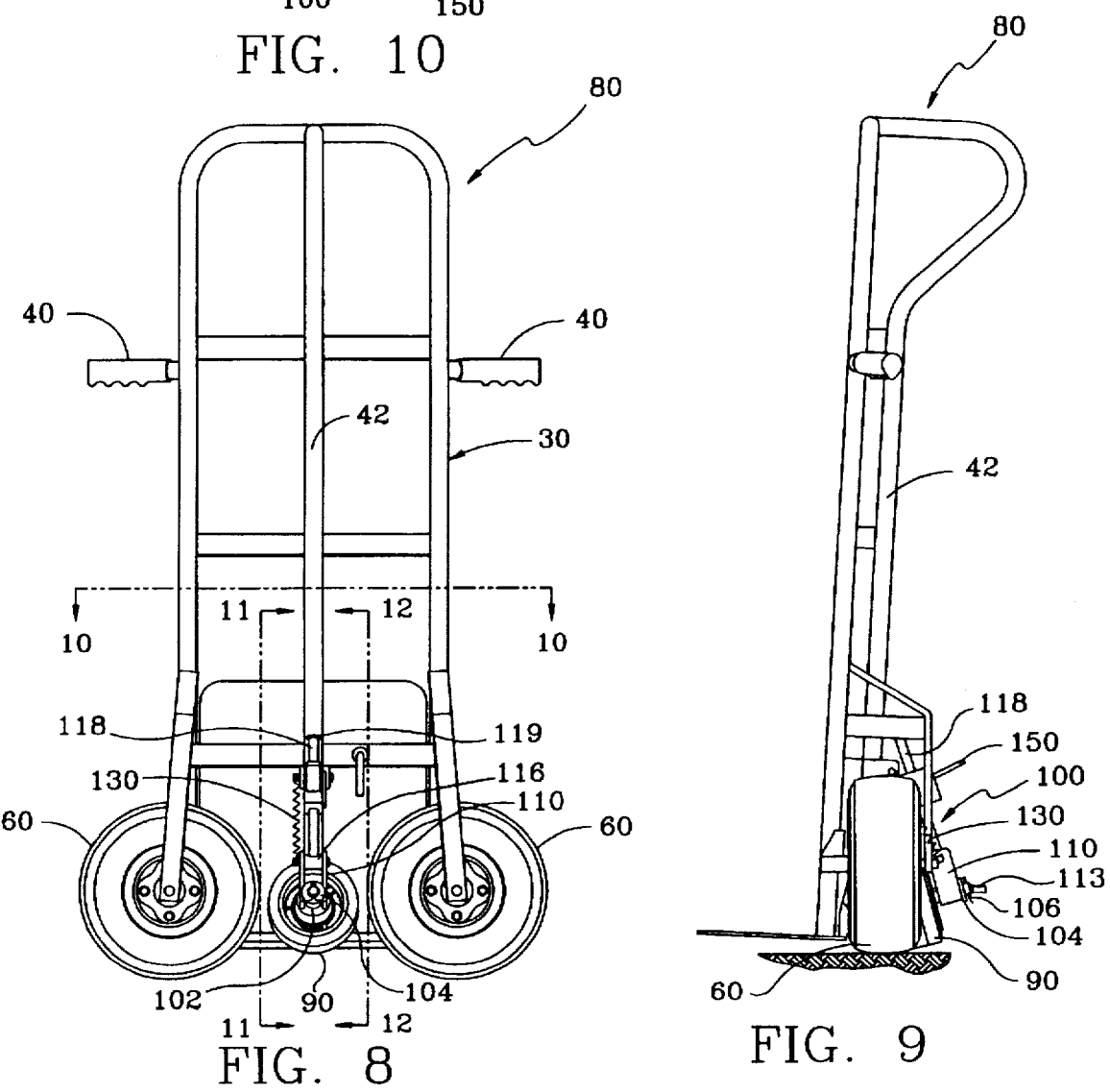

LOAD-CARRYING DOLLY

CROSS REFERENCE TO RELATED APPLICATION

This application is a continuation-in-part of application Ser. No. 08/401,157 filed Mar. 9, 1995, now abandoned.

BACKGROUND OF THE INVENTION

1. Technical Field

This invention relates to hand trucks or dollies and more particularly to hand trucks or dollies which are specially suited for moving relatively thin loads, such as wood panels or drywall panels, or plates of glass, in a relatively confined space.

2. Background Information

Hand trucks or dollies are widely used for transporting heavy loads without the use of motive power. A conventional hand truck or dolly comprises a generally upright frame, a shelf secured to the lower end of the frame and extending transversely from one side of the frame to the other, and a pair of coaxial wheels mounted at the lower end of said frame for moving the hand truck and the load thereon in a forward direction which is transverse to the longitudinal axis or direction of the shelf. Such hand trucks or dollies are widely used. However, the conventional hand truck or dolly is not well suited to moving thin loads, such as loads of plate glass, sheet rock or drywall, or the like, in confined spaces.

When one uses a dolly to load the cargo space of a vehicle, such as a truck or a railroad car, one brings a dolly with a load of sheet material thereon to the remaining vacant interior space, with the sheet material disposed at right angles to the direction which it will assume when loaded into the cargo space. To off load the sheet material from the dolly to the cargo space of the vehicle, it is necessary to swing each sheet through an arc of 90°. If the remaining free space is of a width less than the length (or width) of the sheet material, it is necessary to adopt an even more cumbersome procedure, i.e., to off load the sheet material from the dolly, sheet by sheet, before one reaches the cargo space, and then to rotate the sheet material through an arc of 90° outside the cargo space and then slide it into the cargo space. Such procedure is both cumbersome and time consuming, and there is a certain degree of risk of damage to the sheet material or a carton carrying the same in the process.

A second type of hand truck or dolly, much less common than the conventional type, is especially suited for transporting sheet material. This second type of hand truck comprises a generally upright frame and a horizontally extending shelf attached to the frame at a lower end thereof and extending from one side of a frame to the other. The frame and the shelf are basically similar to those in a conventional dolly. However, the wheels, instead of being mounted for forward movement in a direction transverse to the direction of the shelf, are mounted at right angles to the usual direction, so that the dolly is suited for movement in a direction parallel to the longitudinal direction or axis of the shelf. Such hand trucks or dollies are shown for example, in U.S. Pat. Nos. 394,385; 4,488,733; 4,630,838; and 5,120,072. Another type of hand truck, especially described for movement of sheet material, is shown in U.S. Pat. No. 4,793,624. The device shown in these patents are all characterized by one or more wheels mounted on axles having fixed axes of rotation which are transverse to the direction of the shelf, and one or more wheels which are mounted on casters. A consequence of the caster mounting is that each of these hand trucks is better suited to movement in one direction than in the opposite direction. This is disadvantageous when loading a vehicle. Another disadvantage of the devices in the prior art for transporting sheet material is that they lack lateral stability. With one exception (U.S. Pat. No. 5,120,072), the devices in the patents cited above have only one wheel, or only a pair of coaxial wheels, that rotate about a fixed axis. As a consequence, the shelf of each of these devices may tend to tip in one direction or the other, so that one end is higher then the other. Even the device of U.S. Pat. No. 5,120,072 is not entirely immune from such tipping. It will be noted that the two fixed axis wheels (94 & 96) therein are near one end and at the middle of the shelf (10), so that, if a load having the center of gravity to the left of middle wheel 94 as seen in FIG. 1 or FIG. 3 is placed on the base of shelf 10, there will be some tendency toward tipping.

Another problem that is common with prior art dollies wherein the wheels lie in a plane parallel to the longitudinal axis of the load support shelf, is that such dollies are difficult to turn when the wheels are rotatably mounted on fixed parallel axes.

A problem with prior art dollies in general is that when the dollies are being used to carry a heavy load the dollies must be tilted and balanced at a precise angle to allow easy movement of the dolly in the desired direction. If the dolly is tilted at too small an angle the dolly may become unbalanced and the load may force the dolly forward slamming the load to the horizontal position and possibly damaging the load. If the dolly is tilted at too large an angle the weight of the load will lean backward on the user causing the user to become unbalanced and causing the load and dolly to fall backwards on the user.

SUMMARY OF THE INVENTION

Objectives of the invention include providing an improved load-carrying dolly which is intended for use in transporting loads transverse to the normal direction of load-carrying dollies or hand trucks enabling the dolly to be used in narrow confined spaces.

A further objective of the invention is to provide such a dolly which has a rugged frame formed of tubular metal components interconnected by reinforcing braces.

Another objective of the invention is to provide such a dolly having a pair of spaced primary wheels rotatably mounted on fixed parallel axes for moving the dolly in the direction longitudinal to the load supporting shelf which extends perpendicularly outwardly from the frame.

A still further objective of the invention is to provide such a dolly in which a turning wheel is provided between the two primary load moving wheels, which turning wheel is of a smaller diameter and at an inclined angle to the plane in which the two primary wheels are located to enable the dolly to be turned in a curved path by partially supporting the load in combination with one of the primary wheels while disengaging the other load-carrying wheel from the supporting surface.

Another objective of the invention is to provide such a dolly which is provided with an auxiliary load supporting shelf which is pivotally mounted to lie along the frame of the dolly when out of use, yet which can be pivoted to a generally horizontal position when additional loads are required to be carried than that able to be supported on the primary load support shelf.

Still another objective of the invention is to provide such a dolly in which a pair of handles extend outwardly from the sides of the frame at an angle to assist in moving the dolly;

and in which a main handle extends perpendicularly outwardly from the rear of the frame, which in combination with the two side handles provide for moving the dolly when moving in a straight line as well as when tipping the dolly in an inclined position for a turning movement.

A further objective of the invention is to provide such a dolly in which the turning wheel and its angle of incline are adjustable to aid the operation of the dolly depending upon the height or weight of the load.

A still further objective of the invention is to provide such a dolly in which the turning wheel is removable and may be replaced by one of several types of adjustable wheels.

These objectives and advantages are obtained by the hand truck or load-carrying dolly of the present invention, for supporting a load, wherein said dolly comprises a main load support shelf having first and second ends and a substantially horizontal longitudinal axis extending between said ends; a generally upright frame extending upwardly from said shelf and joined to said shelf; handle means associated with said frame for moving said hand truck; and wheel means for moving said hand truck in a direction generally parallel to the longitudinal axis of said shelf, said wheel means comprising: a pair of in-line primary wheels mounted near the respective ends of said shelf, said wheels being mounted on spaced fixed parallel axles having axes which are substantially perpendicular to the longitudinal axis of the shelf, said pair of wheels rotating in a common plane; and a third wheel mounted between the pair of primary wheels, said third wheel having a fixed axis and rotating in a plane which forms an acute angle with the plane of said pair of primary wheels, said pair of primary wheels being in contact with a supporting surface and said third wheel being out of contact with said supporting surface when said hand truck is being moved along a straight path, and said third wheel and one of said pair of primary wheels being in contact with said supporting surface when said hand truck is turned along a curved path.

BRIEF DESCRIPTION OF THE DRAWINGS

The preferred embodiments of the invention, illustrative of the best modes in which applicant has contemplated applying the principles, is set forth in the following description and is shown in the drawings and is particularly and distinctly pointed out and set forth in the appended claims.

FIG. 1 is a front elevational view of the hand truck or dolly of the present invention, with the auxiliary load support shelf shown in a raised position;

FIG. 2 is a rear elevational view of FIG. 1;

FIG. 3 is a top plan view of FIG. 1, with the auxiliary shelf shown in dot-dash lines in a lowered position;

FIG. 8 is a rear elevational view of a second embodiment of the hand truck or dolly of the present invention;

FIG. 9 is a side elevational view of FIG. 8;

FIG. 10 is an enlarged fragmentary sectional view taken along line 10—10, FIG. 8;

Similar numerals refer to similar parts throughout the drawings.

DESCRIPTION OF THE PREFERRED EMBODIMENTS

Figure 4:
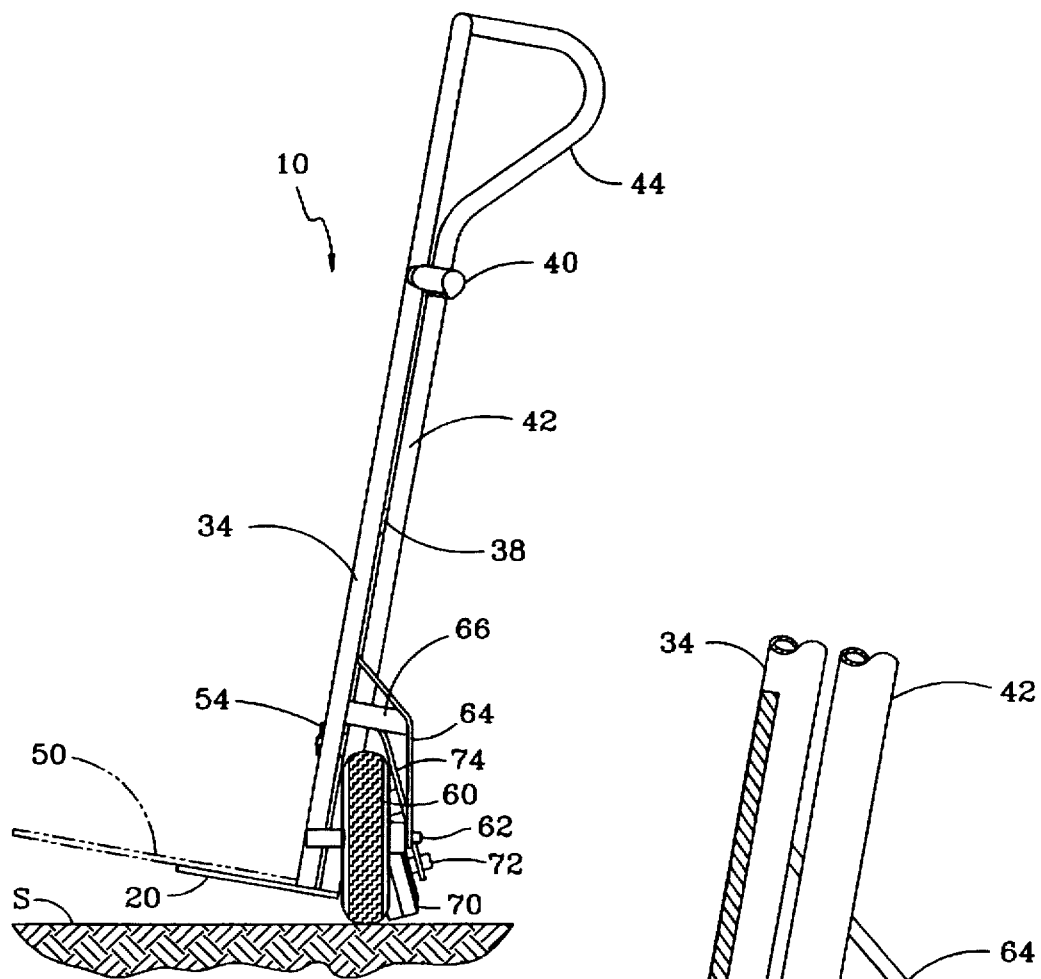
FIG. 4 is a right-hand elevational view of FIG. 1 with the auxiliary shelf shown in dot-dash lines in a lowered position.

This invention will now be described in detail with reference to the drawings, which illustrate the best mode and preferred embodiments of the invention.

Referring now to the drawings, 10 illustrates generally a hand truck or dolly according to the present invention. As seen particularly in FIG. 5, the hand truck or dolly 10 is adapted to support a load L of sheet material. As seen in FIGS. 1, 2, 5 and 6, the hand truck 10 is adapted to travel on a supporting surface S. The supporting surface may be a floor or a pavement. The load L of sheet material preferably will comprise one or more articles of sheet material which have a thickness which is substantially less than either the length or the width. The term "sheet" material is used to include an article which has a length and a width much greater than the thickness, as for example a sheet of glass, a sheet or panel of drywall, wood paneling, or a carton which contains an article of the above type. Typically such articles are of rectangular shape, of considerable extent in the length and width directions, and relatively thin. For example, a standard drywall panel is 4×8 ft. and is only a fraction of an inch thick.

Hand truck 10 comprises a primary shelf 20 which extends longitudinally from one side of the hand truck to the other, a generally upright frame 30 which is generally at right angles to the shelf 20, an auxiliary shelf 50 which can be folded down when a wide load is to be carried, a pair of primary wheels 60 which are at the two sides of the hand truck, and a third wheel or turning wheel 70 for use in moving the hand truck in a curved path.

Shelf 20 may have a generally rectangular shape and extends horizontally in the lateral direction of the hand truck 10. That is, the longitudinal axis 21 (FIG. 3) of shelf 20 is horizontal and runs from one side of the hand truck 10 to the other side. One side of shelf 20, i.e., the side away from the frame 30 and wheels 60, is higher than the other side (the side closest to frame 30 and wheels 60). The slope angle of shelf 20 from one side to the other when the hand truck is transporting a load L along a straight path is a small acute angle, typically about 10°, as may be seen in FIGS. 4 and 7. The slope angle is not critical; as is understood in the art, the slope angle is determined by the location of the center of gravity of the load L, since it is highly desirable for the center of gravity of load L to be directly above the line along which wheels 60 are in contact with the supporting surface S. Shelf 20 is typically made of sheet metal such as steel. A load L is placed on the shelf 20 so that a lower edge of each sheet rests against the upper side of the shelf as shown particularly in FIG. 5.

Hand truck 10 further comprises frame 30, which in the preferred embodiment shown, is of generally inverted U-shape. Frame 30 is secured to shelf 20. Frame 30 comprises a pair of parallel and generally upright side bar or leg portions 32 and 34, which extend upwardly from shelf 20, and a horizontal cross bar portion 36 which joins the upper ends of side bar portions 32 and 34. The lower ends of leg portions 32 and 34 are secured to shelf 20. Rounded transition sections or corners extend between the cross bar portion 36 and the two side bar portions 32 and 34 for smoothness. The frame 30 is preferably made of tubular metal, e.g., tubular steel or tubular aluminum. Each tubular portion or section 32, 34 and 36 has a center axis; the center axes of the three sections or portions lie in a common plane which is at a general right angle to the surface of shelf 20. The three sections 32, 34 and 36 of frame 30 also provide a planar supporting surface against which a sheet (which is load L or a part thereof) may lean for support. Reinforcing strips or slaps 38 extend horizontally between upright frame sections 32 and 34 and are secured thereto as by welding, for increased support. The two side bar sections 32 and 34 of frame 30 form the sides of the frame 30.

Shelf 20 and frame 30 together form a support for a load L. When the load consists of a single sheet, a lower edge of the sheet will be supported by the shelf S and a surface (typically 4×8 ft.) of the sheet will lean against the frame 30. When more than one sheet comprises the load, each sheet will be supported along the lower edge by the shelf 20, and each sheet except the first (i.e., the sheet closest to the frame 30) will lean against the next sheet.

A pair of handles 40 are provided for a user to guide the hand truck 10. Handles or hand grips 40 are at a convenient height and are disposed at equal acute angles, for example 40°, relative to the plane of the center axes of tubular sections 32, 34 and 36 (FIG. 3). These handles or hand grips 40 extend slightly toward the user (and in the direction of wheels 60 and 70) as best seen in FIG. 3, and preferably are welded to sections 32 and 34.

A generally upright auxiliary bar 42 is provided at the middle of hand truck 10. This auxiliary bar 42 extends upwardly from shelf 20 to cross bar 36, and has an upper portion 44 of generally jug handle shape as shown in FIG. 4, and extends rearwardly from the frame. This handle 44 is useful in changing the angle of inclination of the hand truck 10 when moving a load, and for use in turning movement as will be described below.

Figure 5:
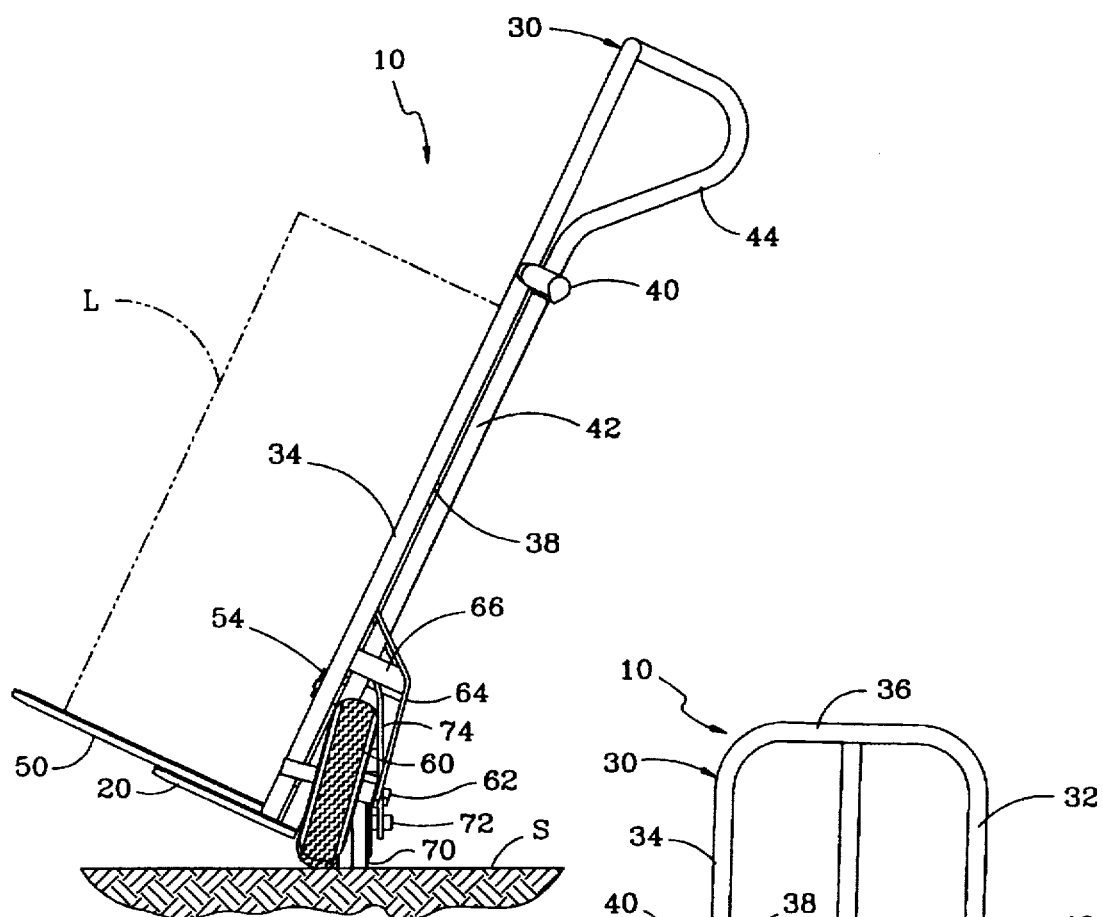
FIG. 5 is a side elevational view similar to FIG. 4 with a load shown in dot-dash lines being supported on the auxiliary shelf, and with the hand truck in a turning position.

An auxiliary shelf 50 is provided for wide loads. When the load L comprises a substantial number of sheets and is thicker (or wider) than the width of the principal shelf 20, auxiliary shelf 50 may be folded down as shown in FIG. 5 wherein it is supported by main shelf 20. When this extra width is not needed, shelf 50 is folded up against frame 30 as may be seen in FIGS. 1, 2, 6 and 7. Auxiliary shelf 50 is supported for pivotal movement by a horizontally extending hinge or pivot pin 52, shown in FIG. 7 which is along one side thereof. A cotter pin 54, which is received in a hole in an outer end of a stub shaft 56, which in turn is anchored to frame member 34 by a sleeve 58, holds the auxiliary shelf 50 in its upright position when not in use. Shaft 56 extends through a hole 57 formed in auxiliary shelf 50 prior to inserting collar pin 54 therein.

Primary wheels 60 are provided near the ends of shelf 20 and near the lower ends of side bar sections 32 and 34 of frame 30, for moving the hand truck by hand in a lateral direction. The wheels 60 are in line, that is, they are disposed rotatably in a common plane. Wheels 60 are mounted on fixed parallel axles 62. Each wheel 60 is mounted on a frame member 32 or 34. To this end the axles 62 are secured to the respective frame members 32 and 34. In addition, struts 64 extend upwardly from axles 62 to frame members 32 and 34 and are secured thereto to provide a rigid support for axles 62. Wheels 60 extend below shelf 20 and below the lower ends of side bar sections 32 and 34, so that the entire hand truck 10, except when one of the wheels 60 is out of contact with a supporting surface S when turning, is supported by wheels 60.

The axes of axles 62 are horizontal and both wheels 60 are vertical and in contact with supporting surface S, when the hand truck is to be moved along a straight path. This is best shown in FIGS. 2 and 4. When the hand truck is to be moved along a straight path with the wheels 60 vertical, the shelf 20 forms a small acute angle (say 10°) with the supporting surface S, and the plane of the axes of tubular sections 32, 34 forms a small acute angle (say 10°) with respect to the vertical. The plane of the axes of tubular sections 32 and 34 (and also the plane of the supporting surface formed by tubular members 32 and 34) is at right angles to the shelf 20.

In accordance with one of the features of the invention, hand truck 10 has a third wheel or turning wheel 70, which is used for turning movement of the hand truck. Turning wheel 70 is supported midway between the two sides of frame 30, so that it is equidistant from, but out of line with, the two primary wheels 60. Turning wheel 70 preferably is of smaller diameter than primary wheels 60. Also, turning wheel 70 is out of contact with the supporting surface S when both of the two primary wheels 60 are in contact with the supporting surface S, as may be seen in FIGS. 1, 2, 4 and 7.

Turning wheel 70 is rotatably mounted on an axle 72, which has a fixed axis of rotation. Turning wheel 70 is supported on the auxiliary bar 42 by means of axle 72 (which is joined to the lower end of auxiliary bar 42 as may be seen in FIG. 7) and by a strut 74 which extends upwardly from axle 72 to auxiliary bar 42. Strut 74 is joined at its upper end to auxiliary bar 42 and provides a rigid support for axle 72 of wheel 70.

Figure 7:
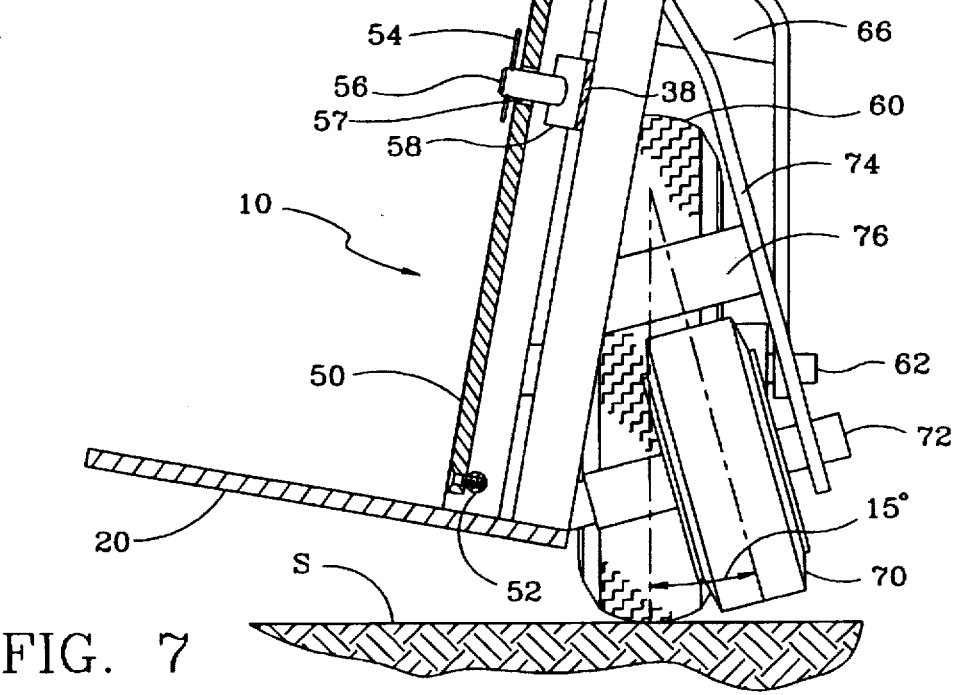
FIG. 7 is an enlarged fragmentary sectional view taken on line 7—7, FIG. 2.

Wheel 70 rotates in a plane which is disposed at a small acute angle to the common plane of primary wheels 60. The small acute angle may have a desired value, as for example 15°, in the specific embodiment illustrated (FIG. 7).

Figure 6:
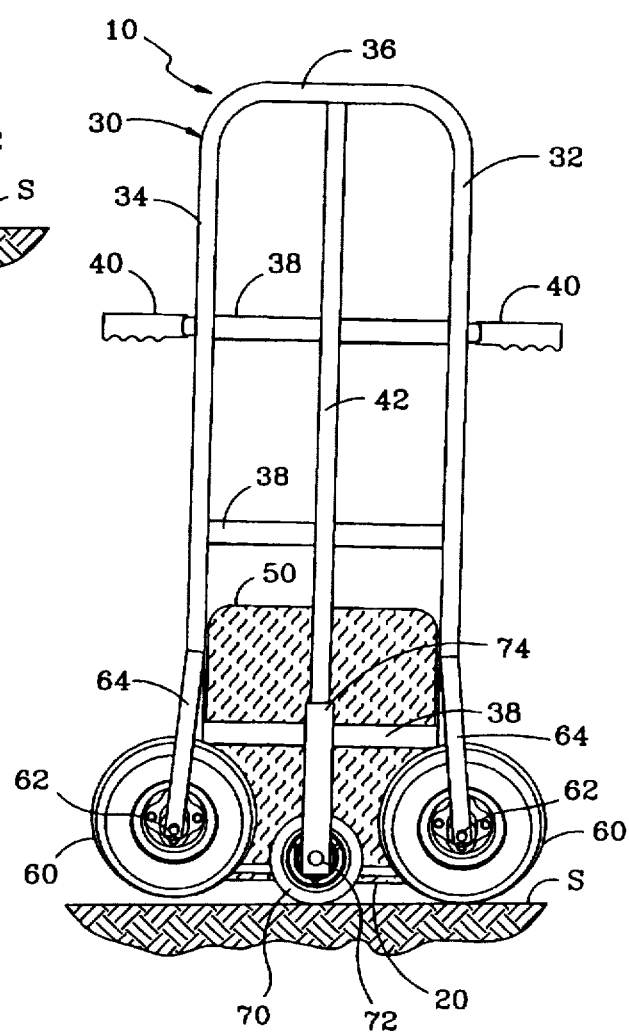
FIG. 6 is a rear elevational view similar to FIG. 2, with the hand truck being shown in a turning position.

For turning movement, the hand truck 10 is tilted to the position shown in FIGS. 5 and 6. The angle of tilt (which may be defined as the angle between shelf 20 and supported surface S) is greater for turning movement than for straight line movement, as may be seen for example by comparing FIG. 5 with FIG. 4. The angle between shelf 20 and a horizontal supporting surface S for turning movement is typically about 25°. When the hand truck 10 is in turning position as shown in FIGS. 5 and 6, third wheel 70 is in a vertical plane, the axis of axle 72 is horizontal, and the third or turning wheel 70 and only one of the two primary wheels 60 touches the ground or supporting surface S. The other primary wheel is raised slightly, as is best seen in FIG. 6.

Operation of the hand truck 10 will now be described.

First, the hand truck 10 is placed in an upright position so that shelf 20 is horizontal and the legs or side bar sections 32 and 34 of the frame are vertical. Then one or more sheets of sheet material are then loaded onto the shelf 20. The auxiliary shelf 50 is down (in the position shown in FIG. 5)

when the thickness of the load L is greater than the width of the primary shelf 20. Then the hand truck 20 is moved to the position for straight line movement, which is the position shown in FIGS. 1, 2, 4 and 7. In this position, the plane of wheels 60 is vertical or nearly so, and the turning wheel 70 is out of contact with the supporting surface. The hand truck 10 and load thereon are then moved to an unloading location, as for example, an interior space in a truck or railroad car. Movement is in a longitudinal direction with respect to the longitudinal axis 21 of shelf 20 (FIG. 3), as for example, in either direction as seen in FIGS. 1 and 2.

When the hand truck 10 and load thereon arrive at the unloading location, the sheets of sheet material are in the same orientation as they will be when unloaded. Workers then take the load off, sheet by sheet, and stack each sheet as desired in the cargo space of the truck or railroad car. They may slide off each individual sheet either laterally (in a sidewise direction as seen in FIGS. 1 and 2) or at right angles-to the plane of frame 30 (i.e., away from frame 30 as seen in FIG. 5). When approaching the unloading site, the hand truck 10 may be moved back and forth, using small turning arcs with the turning wheel 70 and one of the two wheels 60 in contact with the supporting surface S, to get the hand truck 10 and its load L as close as possible to the stack of material (typically a plurality of sheets) already in the cargo space. When unloading is complete, the hand truck 10 is taken away, first by using one or a small number of turning strokes if needed, and then wheeling the hand truck away along a straight path.

It will be seen that a hand truck 10 according to this invention may be used in a much narrower free space than would be possible with a conventional hand truck, in which there are a pair of coaxial wheels supported on a common axis extending from one side to the other of a hand truck frame. It is also apparent that no turning of the sheets S is necessary as they are being unloaded, since as would be the case with a conventional hand truck, since the sheets may be brought in to a cargo space in the same orientation as they will occupy when unloaded.

The hand truck 10 of this invention also is highly advantageous compared to hand trucks for moving sheet material as known in the prior art. Examples of such hand trucks have been specifically cited earlier in the specification. One outstanding characteristic of the hand truck of this invention is that all wheels are mounted on axles having fixed axes of rotation. That is, no caster mountings are used. This is highly advantageous since it permits the hand truck 10 to be moved with equal ease in either longitudinal direction. Caster mountings enable a vehicle so mounted to be moved more easily in one direction than the other. For example, the hand truck shown in U.S. Pat. No. 394,385 would be more easily moved to the left than to the right as shown in FIG. 1 of that patent, since movement to the right may result in unwanted turning of the caster frame 7 therein. The same is true of the hand trucks shown in the other patents cited by number above since all of these hand trucks utilize caster wheels.

Figure 11:
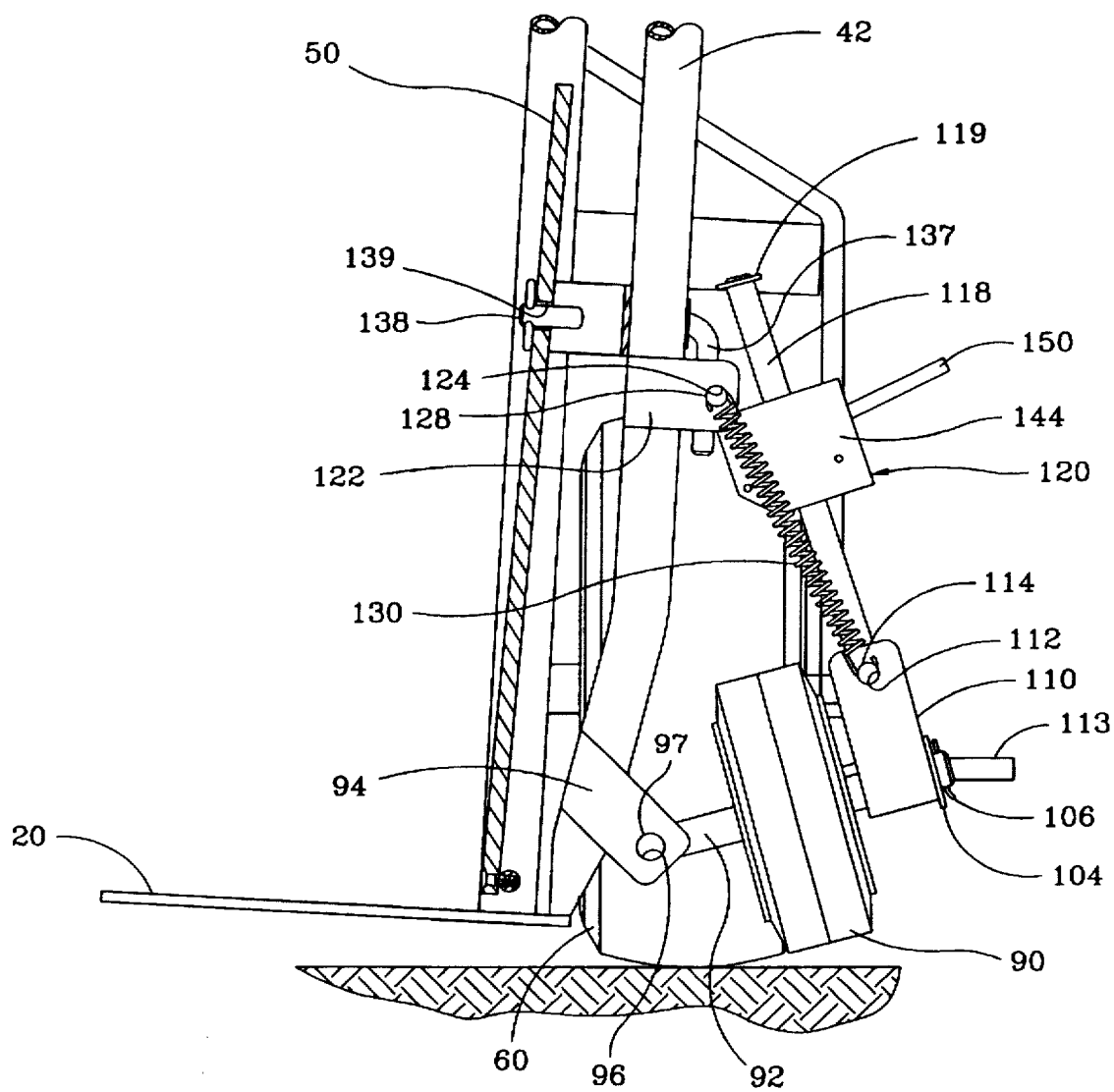
FIG. 11 is an enlarged fragmentary view taken along line 11—11, FIG. 8.
Figure 12:
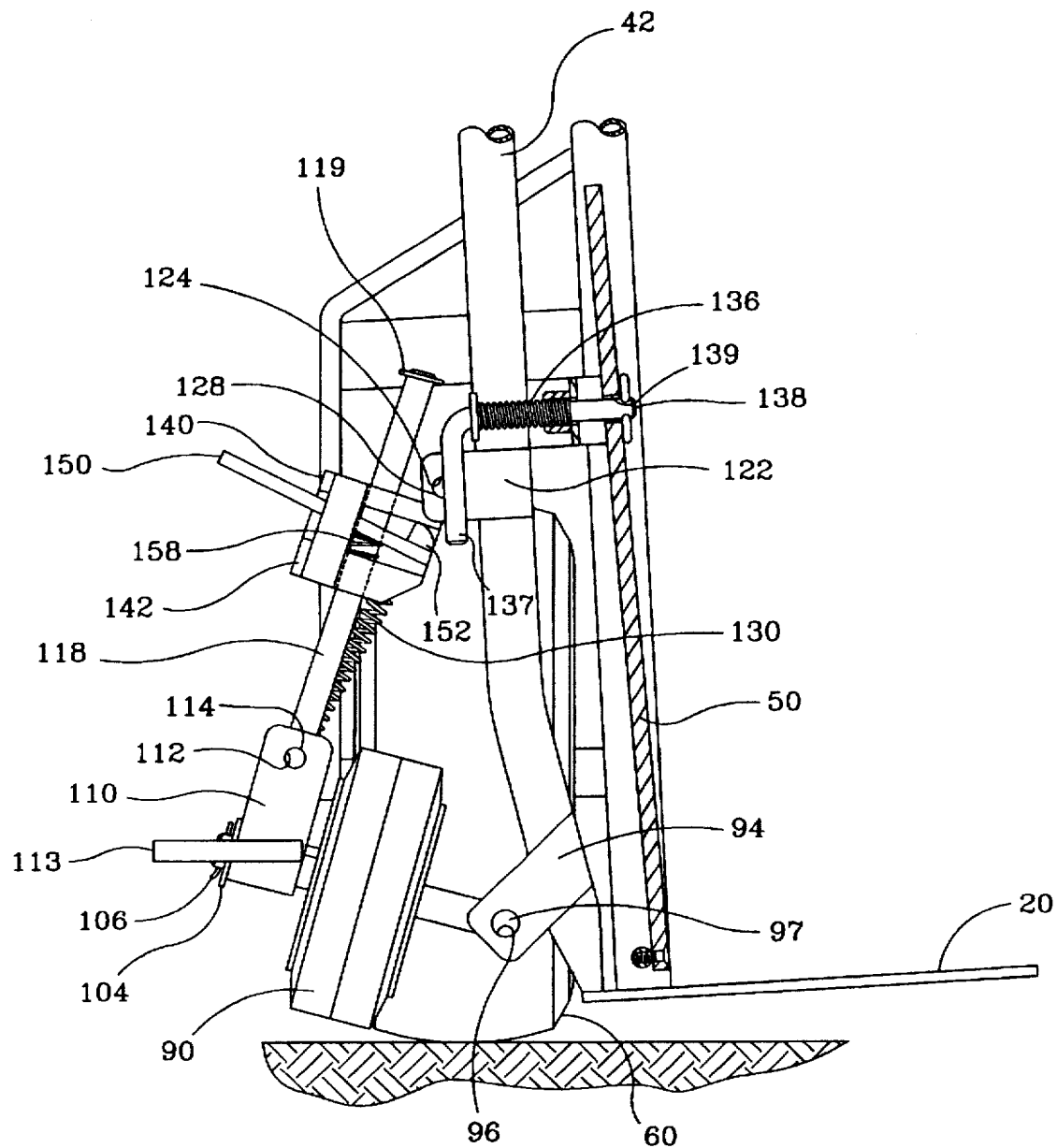
FIG. 12 is an enlarged fragmentary view taken along line 12—12, FIG. 8.

A second embodiment of hand truck of the present invention is shown in FIGS. 8–12 and indicated generally at 80. Truck 80 is similar to truck 10 in that it includes primary shelf 20, upright frame 30, handles 40, auxiliary shelf 50 and primary wheels 60. Truck 80 further includes a third wheel 90 mounted to an axle 92 (FIGS. 9, 11 and 12). Axle 92 has a generally T-shaped end section which is pivotally mounted between a pair of outwardly extending flanges 94 by a pivot pin 97 which extends through a pair of aligned holes 96 formed in flanges 94.

An adjustable strut assembly, indicated generally at 100, extends from an outer portion of axle 92 to an upper position along auxiliary bar 42. Assembly 100 has a cylindrical sleeve 102 (FIG. 8) which extends around axle 92 and is secured thereto by a washer 104 and a cotter pin 106. A pair of spaced flanges 110 (FIGS. 9, 11 and 12) extend angularly upwardly from the sides of sleeve 102 and are formed with aligned holes 112 (FIGS. 11 and 12) for receiving a pivot pin 114. A foot pedal 113 extends outwardly from the outer surface of one of the two flanges 110. Pin 114 extends through a cylindrical sleeve 116 which is positioned between flanges 110 and which is attached perpendicularly to an adjustment bar 118 for pivotally mounting adjustment bar 118 to flanges 110.

Adjustment bar 118 extends through a cam or wedge locking mechanism 120 (FIGS. 11 and 12) which adjustably locks turning wheel 90 at a desired angle in relationship to the common plane of wheels 60, as described below in further detail, and includes a stop washer 119 fastened to the top thereof.

Cam locking mechanism 120 is pivotally attached to a pair of flanges 122 which extend outwardly from auxiliary bar 42 and are spaced above flanges 94. A sleeve 126 (FIG. 10) is positioned between flanges 122 and a pin 128 extends through sleeve 126 and holes 124 which are formed in flanges 122. A coil tension spring 130 extends between pivot pins 114 and 128 and is connected thereto by a pair of end hooks which extend through holes formed in the end of the pins.

Cam locking mechanism 120 further includes upper and lower spaced parallel plates 140 and 142 (FIG. 12), respectively. Upper plate 140 is attached to lower plate 142 on one side by a panel 144 (FIG. 11) and on the other side by a strip of material 146 (FIG. 12) which exposes the inner area between the plates. A top inner end of plate 140 is attached to a bottom of sleeve 126 to provide pivotal movement of cam locking mechanism 120.

An unlocking lever 150 is positioned between plates 140 and 142 and includes an upwardly extending L-shaped inner end 152 formed with a curved top surface to facilitate a sliding movement of end 152 against a bottom surface of plate 140. Adjustment bar 118 extends generally vertically through a plurality of aligned holes formed in plates 140 and 142, and in lever 150. Washer 119 is larger than the hole formed in plate 140 and prevents the end of adjustment bar 118 from sliding out of engagement with cam locking mechanism 120. A coil compression spring 158 (FIG. 12) is positioned around adjustment bar 118 and is located between lever 150 and lower plate 142, and biases lever 150 upwardly causing inner end 152 of lever 150 to contact the bottom surface of upper plate 140.

Adjustable strut assembly 100 and in particular cam locking mechanism 120, allows the inclination angle of wheel 90 to be adjusted by the user depending on the weight and size of the load. Foot pedal 113 is pushed downwardly pivoting wheel 90 around pivot pin 97 thus reducing the acute angle between wheel 90 and the common plane of primary wheels 60. As wheel 90 pivots downwardly around pivot pin 97, flanges 110 pull adjustment bar 118 downward, and sleeve 116 of adjustment bar 118 pivots around pivot pin 114. Adjustment bar 118 slides downwardly through cam locking mechanism 120 causing cam locking mechanism to rotate slightly upwardly around pin 128. Stop washer 119 prevents the free end of adjustment bar 118 from sliding completely through cam locking mechanism 120 and spring 130 provides an upward tension on wheel 90.

The wedge configuration of cam locking mechanism 120 allows adjustment bar 118 to slide downwardly through the holes formed in the cam locking mechanism. The angular relationship between lever 150 and adjustment bar 118 prevents adjustment bar 118 from sliding upwardly through the holes formed in the cam locking mechanism locking wheel 90 in its angular adjusted position.

Wheel 90 is returned to its raised position by applying a downward force on the free end of lever 50 which removes the wedged relationship between the lever and adjustment bar 118 and allows adjustment bar 118 to move freely within the cam mechanism. Spring 130 pulls flanges 110 and thus wheel 90 upwardly causing strut assembly 100 to pivot to its raised position.

Auxiliary shelf 50 of truck 80 may be held in its upright position by a spring-biased pin 137 (FIGS. 11–13) with a T-shaped end 138. End 138 of pin 137 extends through a slotted opening 139 formed in auxiliary shelf 50. End 158 is inserted through opening 139 and rotated 90°. Pin 137 is spring biased away from auxiliary shelf 50 by spring 136 (FIG. 12) and T-shaped end 138 is held against auxiliary shelf 50, securing the shelf in the upright position.

Figure 14:
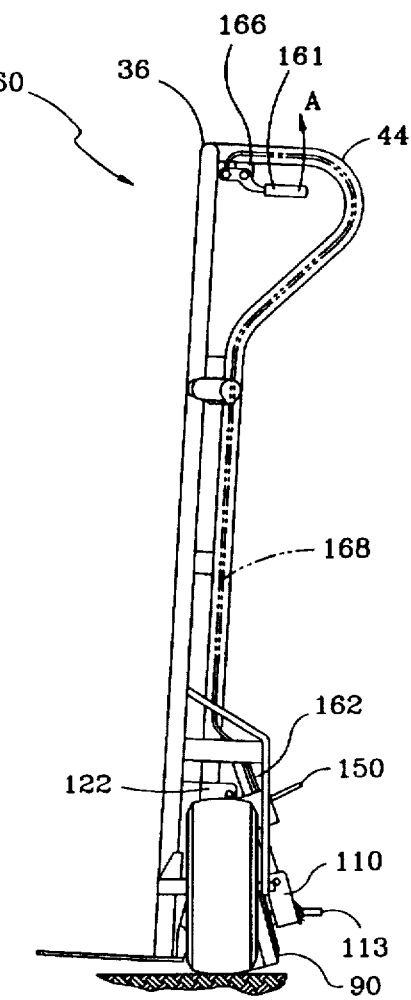
FIG. 14 is a side elevational view of the hand truck or dolly of FIG. 13.

A third embodiment of the truck of the present invention is shown in FIGS. 14 and is indicated generally at 160. Truck 160 is similar to truck 80 of the second embodiment and includes a hand lever 161, a cable 162, and a spring 164 in place of spring 130 for adjusting the angular position of wheel 90. Hand lever 161 is pivotally mounted to a flange 166 which extends downwardly from upper portion 44 of auxiliary bar 42 adjacent the junction of bar 42 and cross bar 36.

Figure 13:
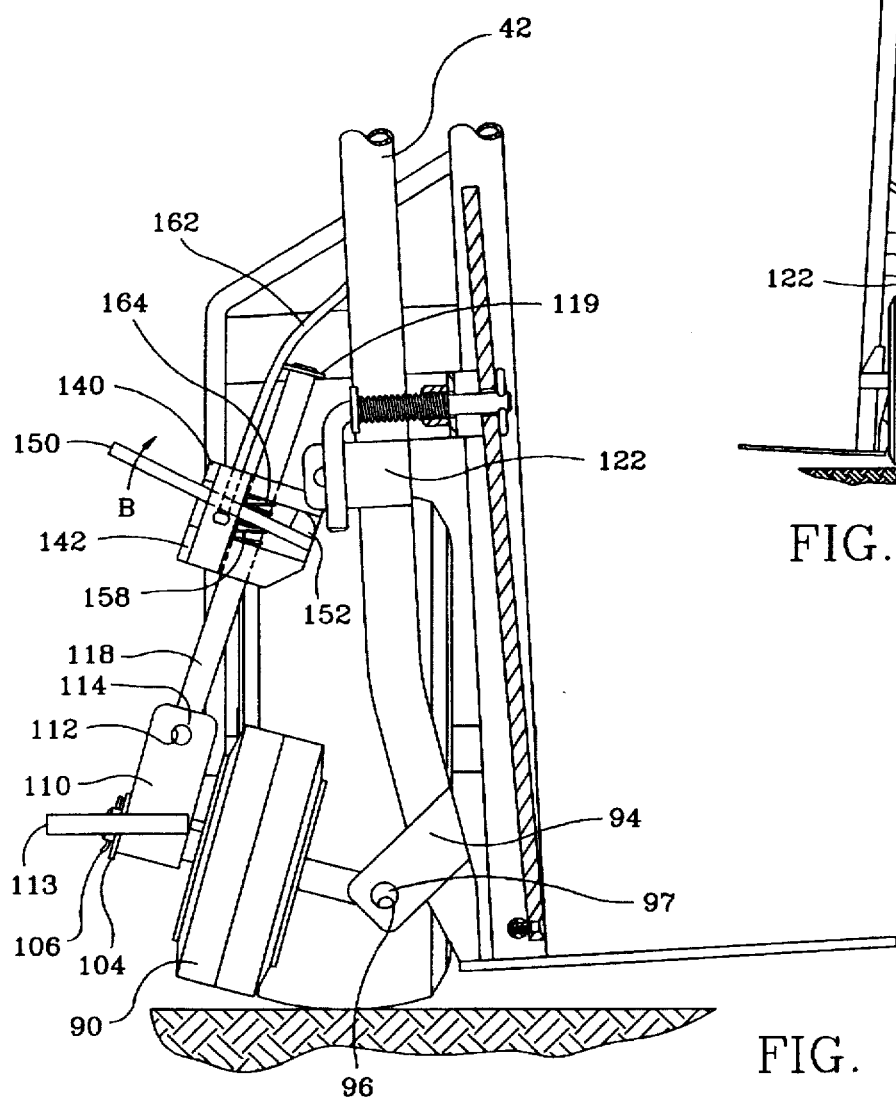
FIG. 13 is an enlarged fragmentary sectional view showing a third embodiment of the present invention.

Cable 162 extends from one end of hand lever 161, through the interior of tubular auxiliary bar 42 (shown by dot-dash line 168, FIG. 14) and attaches to lever 150 (FIG. 13). A second coil compression spring 164 is located between lever 150 and upper plate 140 and applies a downward pressure on lever 150 opposite to that of spring 158. Springs 158 and 164 cooperate to position lever 150 in a generally parallel relationship with plates 140 and 142 and allow adjustment bar 118 to move freely within cam mechanism 120.

Springs 158 and 164 further function as a spring-type shock absorber and allow wheel 90 to move up and down over uneven surfaces. When handle 161 is squeezed toward upper portion 44, as shown by arrow A, FIG. 14, cable 162 pulls the free end of lever 150 upwardly, as shown by arrow B, FIG. 13, and wedges adjustment bar 118 in the locked position, as described above. When handle 161 is released, spring 164 forces lever 150 downwardly to its unlocked position. Wheel 90 pivots downwardly either under its own weight or by the operator forcing foot pedal 113 downwardly.

Figure 16:
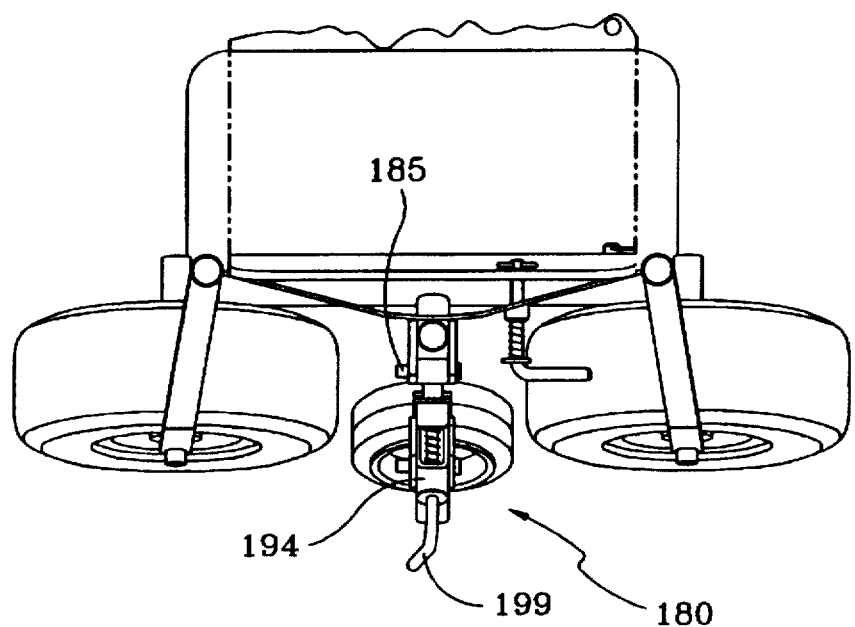
FIG. 16 is an enlarged fragmentary sectional view taken along line 16—16, FIG. 15.
Figure 15:
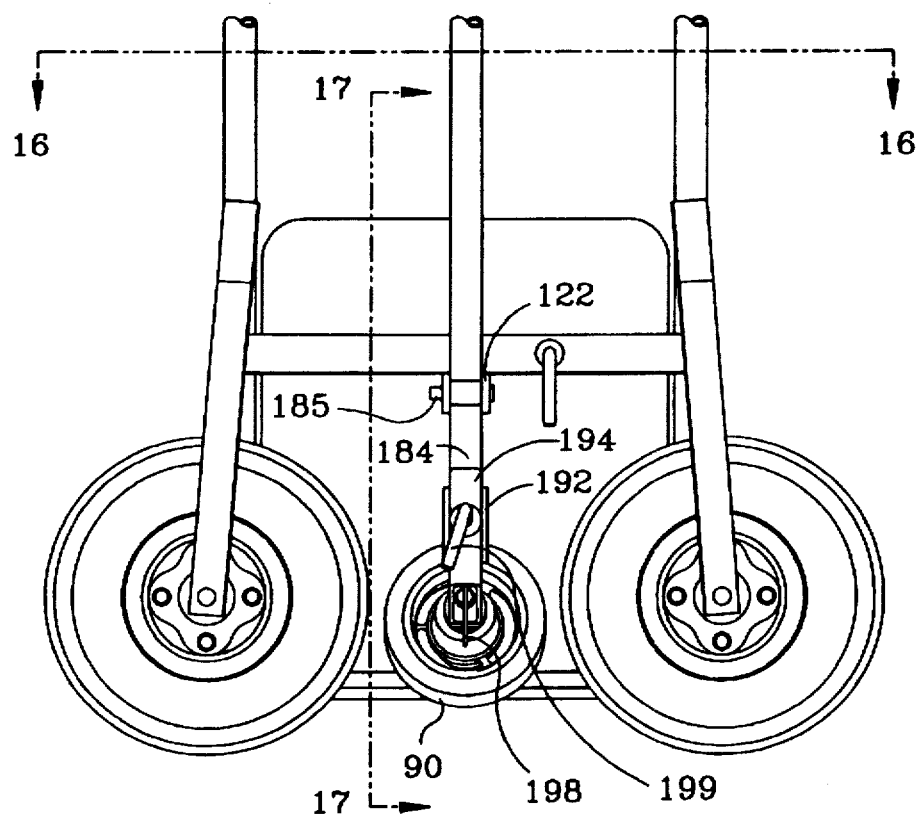
FIG. 15 is a enlarged fragmentary rear elevational view of a fourth embodiment of the present invention.
Figure 18:
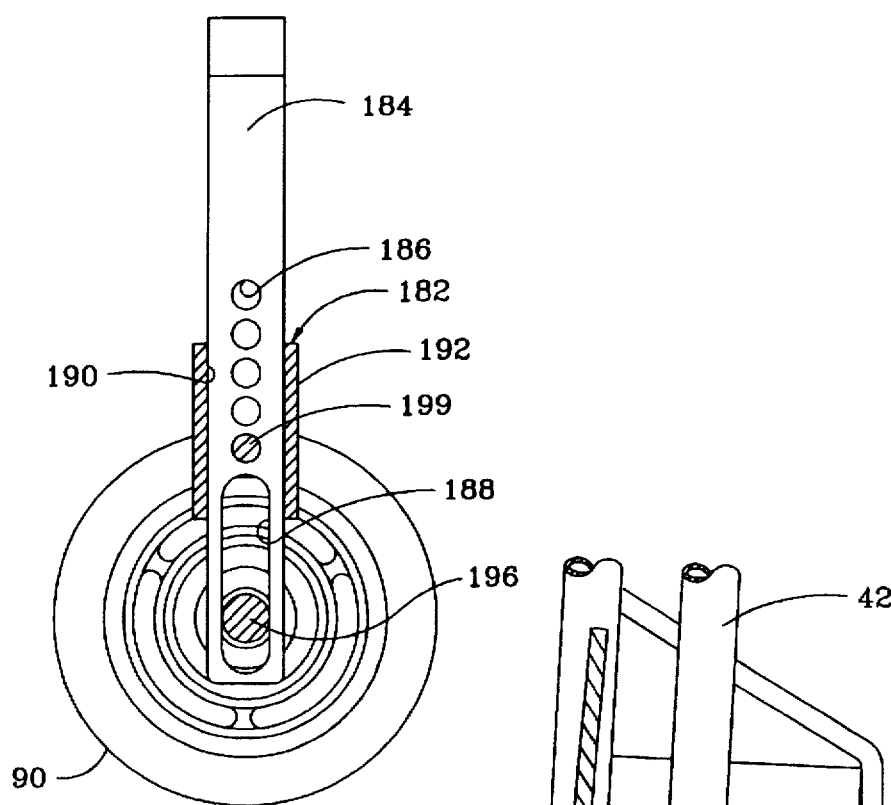
FIG. 18 is an enlarged fragmentary sectional view taken along line 18—18, FIG. 17.
Figure 17:
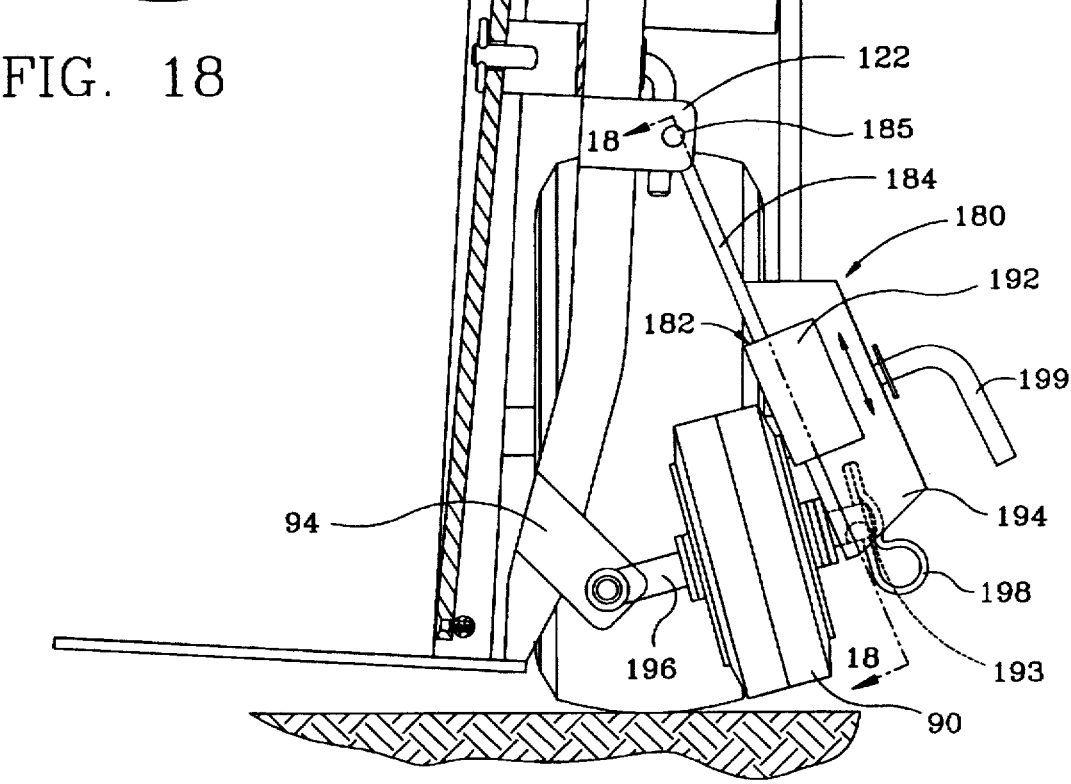
FIG. 17 is a enlarge sectional view taken along line 17—17, FIG. 15.

A fourth embodiment is shown in FIGS. 15 and 16, and is indicated generally at 170. Adjustable strut assembly 100 and cam locking mechanism 120 of trucks 80 and 160 is replaced by a manually operated locking strut assembly 180. Strut 180 attaches between flanges 94 and 122 in the same manner as strut assembly 100. Strut 180 includes a manually operate adjustable tongue and groove assembly 182 shown in FIG. 18. Tongue and groove assembly 182 includes a tongue 184 formed with a plurality of holes 186 and an elongated bottom slot 188. Tongue 184 is pivotally mounted at its upper end to flanges 122 by a pivot pin 185. A groove or slide channel 190 is formed by a pair of L-shaped flanges 192 which are attached to and extend from the sides of a hollow rectangular-shaped outer housing 194 (FIG. 17). Housing 194 is formed with a hole 193 which aligns with slot 188.

Axle 196 of wheel 90 extends through slot 188 and hole 193 and is secured therein by a cotter pin 198 which extends through a hole formed in the outer end of axle 196. Axle 196 is slidably engaged by tongue 184 and attached to housing 194 wherein housing 194 is manually slid along tongue 184 causing axle 196 to adjust the angle between wheel 90 and the common plane of primary wheels 60. A spring biased pin 199 snaps in one of holes 186 locking wheel 90 in the adjusted position.

Accordingly, adjustable strut assemblies 120 and 180 allow the user to adjust the inclination angle of wheel 90 while continually balancing trucks 80, 160 and 170 with handles 40. Additionally, foot pedal 113 and lever 150 allow the user to operate strut assembly 120 using the user's foot. Also, hand lever 161, cable 162 and spring 164 allow wheel 90 to travel up and down over uneven surfaces and allow the user to lock wheel 90 at the desired angle by activating hand lever 161. Moreover, manual strut assembly 180 allows the user to lock wheel 90 in one position for repeated operation of truck 170.

Accordingly, the improved load-carrying dolly or hand truck of the invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not-limited to the exact details shown or described.

Having now described the features, discoveries and principles of the invention, the manner in which the improved load-carrying dolly is constructed and used, the characteristics of the construction, and the advantageous, new and useful results obtained; the new and useful structures, devices, elements, arrangements, parts and combinations, are set forth in the appended claims.

I claim:

1. A hand truck for transporting a load, said hand truck comprising:

a main load support shelf having first and second ends and a substantially horizontal longitudinal axis extending between said ends;

a generally upright frame extending upwardly from said shelf and joined to said shelf, said frame being formed by an inverted U-shaped tubular metal member comprising a pair of spaced side bar portions which extend upwardly from said main load support shelf and a crossbar portion interconnecting said side bar portions at upper portions thereof, said side bar portions lie in a common plane;

handle means associated with said frame for moving said hand truck; and wheel means for moving said hand truck in a direction generally parallel to the longitudinal axis of said shelf, said wheel means comprising:

a pair of in-line primary wheels mounted near the respective ends of said shelf, said wheels being mounted on spaced fixed parallel axles having axes which are substantially perpendicular to the longitudinal axis of the shelf, said pair of wheels rotating in a common plane; and a third wheel mounted between the pair of primary wheels, said third wheel having a fixed axis and rotating in a plane which forms an acute angle with the plane of said pair of primary wheels, said pair of primary wheels being in contact with a supporting surface and said third wheel being out of contact with said supporting surface when said hand truck is being moved along a straight path, and said third wheel and one of said pair of primary wheels being in contact with said supporting surface when said hand truck is being turned along a curved path.

2. A hand truck according to claim 1 in which said side bar portions extend parallel to one another and have axes which lie in a common plane with said cross bar portion.

3. A hand truck according to claim 2, further including a generally upright auxiliary bar extending upwardly from said shelf to, and terminating at, an upper end in said crossbar portion, said auxiliary bar being disposed essentially midway between said side bar portions.

4. A hand truck according to claim 3 in which said auxiliary bar has a handle formed in an upper portion thereof, said handle being adapted to move the hand truck angularly to place said third wheel in contact with said supporting surface for turning movement and out of contact with said supporting surface for movement in a straight path.

5. A hand truck according to claim 3 in which said primary wheels are supported by respective side bar portions and said third wheel is supported by said auxiliary bar.

6. A hand truck according to claim 1 in which said third wheel has a smaller diameter than said primary wheels and is disposed equidistant from said primary wheels.

7. A hand truck according to claim 1 including an auxiliary load carrying shelf pivotally mounted adjacent said main shelf for movement between raised and lowered positions; and retention means for retaining said auxiliary shelf in the raised position, said auxiliary shelf is in abutting engagement with, and is supported by the main shelf when in the lowered position.

8. A hand truck according to claim 7 in which the retention means includes a stub shaft which extends through a hole formed in said auxiliary shelf and a cotter pin engageable with the stub shaft for locking the auxiliary shelf in the raised position.

9. A hand truck according to claim 8 in which the retention means includes a spring-biased pin having a T-shaped end which extends through a slotted hole formed in said auxiliary shelf.

10. A hand truck according to claim 1 in which the plane of the third wheel forms an included angle of approximately 15° with the common plane of the pair of primary wheels.

11. A hand truck for transporting a load, said hand truck including:

a main load support shelf having first and second ends and a substantially horizontal longitudinal axis extending between said ends;

a generally upright frame extending upwardly from said shelf and joined to said shelf;

handle means associated with said frame for moving said hand truck;

wheel means for moving said hand truck in a direction generally parallel to the longitudinal axis of said shelf, said wheel means comprising:

a pair of in-line primary wheels mounted near the respective ends of said shelf, said wheels being mounted on spaced fixed parallel axles having axes which are substantially perpendicular to the longitudinal axis of the shelf, said pair of wheels rotating in a common plane; and a third wheel mounted between the pair of primary wheels, said third wheel has an adjustable axle and rotates in a plane which forms an angle of rotation with the common plane of said pair of primary wheels, said pair of primary wheels being in contact with a supporting surface and said third wheel being out of contact with said supporting surface when said hand truck is being moved along a straight path, and said third wheel and one of said pair of primary wheels being in contact with said supporting surface when said hand truck is being turned along a curved path; and adjustment means for adjusting the axle and angle of rotation of the third wheel with respect to the plane of said primary wheels.

12. A hand truck according to claim 11 in which said frame includes a pair of spaced parallel side bar portions which extend upwardly from said main shelf, a crossbar portion interconnecting said side bar portions at upper portions thereof and a pair of hand grips, disposed at acute angles to the plane of the axes of said side bar portions and said cross bar portion, for moving said hand truck in a lateral direction, said side bar portions and said cross bar portion having axes which lie in a common plane.

13. A hand truck according to claim 12, further including a generally upright auxiliary bar extending upwardly from said shelf to, and terminating at, an upper end in said crossbar portion, said auxiliary bar being disposed essentially midway between said side bar portions and having a handle formed in an upper portion thereof adapted to move the hand truck angularly to place said third wheel in contact with said supporting surface for movement in a straight path.

14. A hand truck according to claim 11 in which said primary wheels are supported by respective side bar portions, and said third wheel, which has a smaller diameter than said primary wheels is disposed equidistant from said primary wheels.

15. The hand truck according to claim 11 in which the adjustment means includes a cam locking mechanism pivotally attached between the frame and the axle of the third wheel, said cam locking mechanism permitting the third wheel to pivot with respect to the common plane of said pair of primary wheels and selectively change the angle of rotation of said third wheel with respect to said common plane.

16. The hand truck according to claim 15 in which the adjustment means further includes a foot pedal for manually applying a force on said adjustment means for adjusting the angle of rotation of the third wheel.

17. The hand truck according to claim 15 in which the cam locking mechanism includes a pair of spaced plates, a spring-biased lever positioned between said plates, and an adjustment bar extending through and slidingly engaged within holes formed in said plates and lever.

18. The hand truck according to claim 17 in which a cable extends between the lever and a handle mounted on the frame for moving said lever to adjust the angle of rotation of the third wheel.

19. The hand truck according to claim 11 in which the adjustment means includes a manually operated tongue and groove mechanism for adjusting the angle of rotation of the third wheel.

20. The hand truck according to claim 19 in which the tongue and groove mechanism includes a tongue formed with a plurality of holes, a housing formed with a hole through which the axle of the third wheel extends and formed with a groove in which said tongue slides, and a pin for selective engagement into one of said holes for locking the tongue in an adjusted position in said groove.

* * * * *